United States Patent [19]
Blanchard et al.

[11] Patent Number: 5,124,304
[45] Date of Patent: Jun. 23, 1992

[54] MULTI-PURPOSE CATALYST FOR VEHICULAR CATALYTICS CONVERTERS

[75] Inventors: Gilbert Blanchard, Le Plessis Belleville; Jack Caillod, Taverny; Richard Doziere, Beynes; Michel Prigent, Rueil Malmaison, all of France

[73] Assignee: Pro-Catalyse, Rueil Malmaison, France

[21] Appl. No.: 668,217

[22] Filed: Mar. 12, 1991

Related U.S. Application Data

[63] Continuation of Ser. No. 399,442, Aug. 28, 1989, Pat. No. 5,053,378, which is a continuation of Ser. No. 23,242, Mar. 9, 1987, abandoned.

[30] Foreign Application Priority Data

Mar. 7, 1986 [FR] France .................. 86 03221

[51] Int. Cl.$^5$ .................. B01J 21/06; B01J 23/10; B01J 23/40
[52] U.S. Cl. .................. 502/304; 502/242; 423/213.5
[58] Field of Search .................. 502/242, 304; 423/213.5

[56] References Cited

U.S. PATENT DOCUMENTS

| | | | |
|---|---|---|---|
| 4,294,726 | 10/1981 | Bozon et al. | 252/462 |
| 4,316,822 | 2/1982 | Fujitani et al. | 252/462 |
| 4,504,598 | 3/1985 | Ono et al. | 502/303 |
| 4,581,343 | 4/1986 | Blanchard et al. | 502/241 |

*Primary Examiner*—W. J. Shine
*Attorney, Agent, or Firm*—Burns, Doane, Swecker & Mathis

[57] ABSTRACT

Multiple purpose catalysts adapted for the treatment of internal combustion engine exhaust gases comprise a particulate refractory oxide support, e.g., alumina particles, having an active catalytic phase deposited thereon, said active catalytic phase including zirconium, cerium and platinum, and optionally iridium, rhodium, palladium and other metal values.

16 Claims, No Drawings

MULTI-PURPOSE CATALYST FOR VEHICULAR CATALYTICS CONVERTERS

This application is a continuation of application Ser. No. 07/399,442, filed Aug. 28, 1989, now U.S. Pat. No. 5,053,378, which is a continuation of Ser. No. 023,242, filed Mar. 9, 1987, abandoned.

BACKGROUND OF THE INVENTION

1. Field of the Invention

The present invention relates to particular multiple purpose catalysts having enhanced mechanical properties, and, more especially, to such catalysts particularly adopted for the treatment of the exhaust gases emanating from internal combustion engines.

By the expression "multiple purpose catalysts" as utilized herein, are intended those catalysts useful, in particular, for the oxidation of carbon monoxide and the hydrocarbons present in vehicular exhaust gases, as well as for the simultaneous reduction of the nitrogen oxides ($NO_x$) present therein.

2. Description of the Prior Art

In internal combustion gasoline engines, the compositions of the exhaust gases may be controlled around a stoichiometric equilibrium, such as by the catalytic oxidation and reduction of the different components thereof, thus producing water, carbon dioxide and nitrogen. The means typically employed to control the composition of exhaust gases at about stoichiometric equilibrium includes, in particular, the continuous regulation of the air/fuel ratio at the engine intake and/or the introduction of additional oxygen upstream from the catalyst. The composition of the exhaust gas thus varies over periods of time on the order of one second, from a composition containing a relative excess of oxidizing compounds (designated "lean"), to a composition containing an excess of reducing compounds (designated "rich"), and vice versa.

In particular, the regulation designated "lean" is such that the amounts of oxygen and nitrogen oxide present are higher than those required for the total oxidation of carbon monoxide, the hydrocarbons and hydrogen. Conversely, the regulation designated "rich" is such that the amounts of carbon monoxide, hydrocarbons and hydrogen present are higher than those required for the total reduction of the oxygen and nitrogen oxides.

A great number of catalysts have already been proposed to this art for the total elimination, simultaneously, of the nitrogen oxides, unburned hydrocarbons and carbon monoxide contained in the exhaust gases of internal combustion engines. These catalysts typically contain precious metals, possibly combined with a base metal, such as nickel, iron, zirconium, vanadium, chromium or cerium, deposited onto a conventional refractory oxide support.

Thus, European Patent No. 27,069, assigned to the assignee hereof, describes a catalyst comprising a refractory oxide support and an active phase of cerium, iron, at least one metal such as platinum or palladium, and at least one metal such as iridium or rhodium.

According to German Patent No. 3,233,500, multiple purpose catalysts comprising an active phase of rhodium, palladium, iron and cerium, are also known.

In French Patent No. 2,568,143, also assigned to the assignee hereof, multiple purpose catalysts are described having rhodium, palladium, iron, cerium and zirconium active phases.

These catalysts, although they indeed possess sufficient activity to satisfy the anti-pollution standards adopted in countries such as the United States and Japan, have the disadvantage in that a portion of their multi-purpose activity diminishes over time when used in an automotive catalytic converter.

A further disadvantage of the catalysts of the prior art resides in the fact that, when used in particle form (spheres, tablets, extrudates, pellets, etc.), specifically in catalytic converters for exhaust gases, their mechanical properties, and especially their resistance to wear and attrition, are not always completely satisfactory.

The consequences of such mechanical wear relative to the catalytic performance of catalysts of this type are apparent. Their economical use is also adversely affected.

Therefore, mechanical wear constitutes a significant additional problem, especially when superimposed on the aforementioned problem of maintenance of the multiple purpose activity of these particular catalysts.

SUMMARY OF THE INVENTION

Accordingly, a major object of the present invention is the provision of improved multiple purpose catalysts having not only enhanced long term stability, but also enhanced mechanical strength/properties. The subject novel catalysts are especially adapted for use in automotive catalytic converters.

Briefly, the present invention features novel multi-purpose catalysts comprising a particulate refractory oxide support having deposited thereon an active phase which comprises zirconium, cerium and platinum.

DETAILED DESCRIPTION OF THE PREFERRED EMBODIMENTS OF THE INVENTION

More particularly according to the present invention, it has now been determined that the subject multiple purpose catalysts based on zirconium, cerium and platinum remedy the disadvantages of the catalysts of the prior art and exhibit, quite unexpectedly and surprisingly, great multi-purpose activity, remarkable stability over time and markedly enhanced mechanical properties, specifically high resistance to attrition.

The particulate support consistent herewith is advantageously based on a refractory oxide. It may include, for example, silica, alumina, aluminosilicates or mixed oxides, e.g., alumina combined with silica and/or titanium dioxide.

The alumina based supports are especially suitable.

In a preferred embodiment of the invention, a support of alumina particles, having a specific surface area of from 25 to 350 $m^2/g$ preferably having specific surface area of from 25 to 250 $m^2/g$ and more preferably from 70 to 150 $m^2/g$, is used. It desirably has a total pore volume ranging from 0.5 to 2 $cm^3/g$ and more preferably from 0.8 to 1.7 $cm^2/g$.

The support preferably has a macroporosity such that the volume of those pores having a diameter greater than 1000 Å ranges from about 0.05 to 0.6 $cm^3$ and preferably from 0.2 to 0.5 $cm^3/g$.

Such supports may be prepared in particulate form, for example, from the active alumina prepared by the process described in U.S. Pat. No. 2,915,365 and agglomerated by the process described in U.S. Pat. No. 2,881,051.

These supports may also be prepared by autoclaving the aforementioned agglomerates in a neutral or acid medium and drying and calcining them, as described in French Patent Nos. 1,449,904 and 1,386,364.

The alumina supports may also be produced by the process described in French Patent No. 2,399,276, or the process described in European Patent No. 15,801, also assigned to the assignee hereof In the latter example, alumina spheres having double porosity are produced, having a total pore volume of from 0.55 to 1.7 cm$^3$/g, a micropore volume (consisting of pores having a diameter less than 0.06 μm) of from 0.5 to 1.0 cm$^3$g, a macropore volume (consisting of pores having a diameter larger than 0.06 μm) of from 0.05 to 0.7 cm$^3$/g, an average diameter of macropores of from 0.1 to 10 μm, a specific surface area of from 80 to 350 m$^2$/kg, and a crushing resistance in excess of 1 kg, with the alumina essentially being in the form of one of the phases, eta, gamma, delta or theta.

Generally, the particulate alumina supports according to the invention may be treated, in a manner per se known to this art, with porogenic agents, such as those based on cellulose, naphthalene, natural gums, synthetic polymers, etc., to provide them with the desired porosity.

The supports may be advantageously further treated such as to provide them with good thermal stability over time, as is also known to this art. These treatments consist, in particular, of introducing alkaline earth metals, silica and/or trivalent rare earths. The stabilized supports described in French Patents Nos. 2,257,335 and 2,290,950, assigned to the assignee hereof, are especially suitable.

The total content in cerium and zirconium (expressed as elemental Ce and Zr) of the active phase of the catalysts according to the invention advantageously ranges from 0.1% and to 20% by weight relative to the weight of the support. This content preferably ranges from 0.3% to 12% and more preferably from 0.3% to 8%.

The platinum content of the active phase of the catalysts of the invention advantageously ranges from 0.011 to 0.5% by weight relative to the weight of the support and preferably from 0.03% to 0.25%.

In another embodiment of the invention, the subject catalysts further comprise at least one metal selected from among iridium and rhodium.

The total content by weight of these latter metals relative to the weight of the support advantageously ranges from 0.002% to 0.1% and more preferably from 0.005% to 0.02%.

In yet another embodiment of the invention, the subject catalysts may also contain palladium.

Preferably, the catalysts containing palladium have a content of Pd of from 0.01% to 0.5% and more preferably from 0.03% to 0.25% by weight with respect to the weight of the support.

In still another embodiment of the invention, the catalysts may further comprise at least one of the following metals: tungsten, nickel, manganese, tin and rhenium. The total content by weight of these metals relative to the weight of the support ranges from about 0.2% to 5%.

The catalysts according to the invention may be prepared by conventional methods, preferably by the impregnation of the support using inorganic or organic solutions of the metals that are to be introduced. The impregnation may be carried out using common solutions of the metals, or successively using different solutions thereof.

In a preferred embodiment of the invention, the support is successively impregnated with a solution containing cerium and zirconium compounds, and possibly palladium compounds, followed by a solution or solutions containing the platinum or rhodium compounds that are to be introduced.

Exemplary of the cerium and zirconium compounds that may be used, the cerium and zirconium salts are representative, particularly cerous nitrate, cerous acetate, cerous chloride, ceric ammonium nitrate, zirconyl nitrate and zirconium tetrachloride.

Exemplary of the platinum compounds that may be used, representative are the chloroplatinic acids, for example, hexachloroplatinic acid and platinum (II) dichloride.

Exemplary of the rhodium and palladium compounds that may be used, representative are hydrated rhodium trichloride, palladium chloride, palladium nitrate and rhodium (III) chloropentamine dichloride and palladium (II) tetraamine dichloride.

The depth of the impregnation by these elements may advantageously be controlled by methods known to this art and, in particular, by the addition to the solution of the previous metals of a certain amount of a mineral or organic acid. Typically, nitric acid, hydrochloric acid, hydrofluoric acid, acetic acid, citric acid, or oxalic acid are used.

Following the impregnation of the support, the catalyst is dried and then activated in a stream of air at a temperature of from about 300° to 800° C. for several hours.

It has thus been found that the catalysts according to the invention permit the elimination, with high efficiency, of the major portion of carbon monoxide, unburned hydrocarbons, as well as the nitrogen oxides present in the exhaust gases of internal combustion engines, that they have remarkable stability over time, and that, in addition, they have high mechanical properties, in particular high resistance to attrition and crushing.

In order to further illustrate the present invention and the advantages thereof, the following specific examples are given, it being understood that same are intended only as illustrative and in nowise limitative.

EXAMPLE 1

Preparation of a Catalyst (A) of the Prior Art (Comparative Example)

100 g of activated alumina spheres having a specific surface of 250 m$^2$/g and a total pore volume of 0.55 cm$^3$/g, were impregnated with 55 cm$^3$ of a solution of cerium nitrate and palladium nitrate, containing 5.0 g cerium and 50 mg palladium.

After a contact time of 30 min, the spheres were dried at 150° C., then calcined in air at 400° C. for 3 hr. They were then impregnated with 55 cm$^3$ of a solution of chloroplatinic acid and hydrated rhodium trichloride, containing 110 mg platinum and 12.5 mg rhodium.

After 30 min of contact, the spheres were dried at 150° C., then activated at 400° C. for 3 hr in a stream of hydrogen circulating at a rate of 200 liters per hour.

The catalyst (A) prepared in this manner contained, by weight relative to the support, 0.110% platinum, 0.0125% rhodium, 0.05% palladium and 5% cerium.

EXAMPLE 2

Preparation of a Catalyst (B) of the Prior Art (Comparative Example 100 g of gamma-alumina spheres were prepared by the process described in French Patents Nos. 1,449,904 and 1,386,364 by autoclaving the active alumina agglomerates in the presence of acid, followed by drying and calcination The alumina spheres had a specific surface of 100 $m^2/g$, a total pore volume of 0.90 $cm^3/g$ and a volume of 0.40 $cm^3/g$ consisting of macropores having a diameter larger than 1000 Å.

These spheres were impregnated with 90 $cm^3$ of an aqueous solution of cerous nitrate and iron nitrate, containing 4.0 g cerium and 2.0 g iron.

After 30 min of contact, the spheres were dried at 150° C., then calcined in air at 600° C. for 3 hr.

The spheres were then impregnated with 90 $cm^3$ of a solution of palladium nitrate and hydrated rhodium trichloride, containing 160 mg palladium and 12.5 mg rhodium.

After 30 min of contact, the spheres were dried at 150° C., then activated at 400° C. for 3 hr in a stream of hydrogen circulating at 200 liters per hour.

The catalyst (B) prepared in this manner contained, by weight relative to the support, 0.160% palladium, 0.0125% rhodium, 4.0% cerium and 2% iron.

EXAMPLE 3

Preparation of a Catalyst (C) of the Prior Art (Comparative Example 100 g of alumina spheres were prepared by the process described in European Patent No. 15,801.

These spheres had a specific surface of 100 $m^2/g$, a total pore volume of 1.20 $cm^3/g$ and a volume of 0.45 $cm^3/g$ consisting of macropores having a diameter larger than 100 Å.

The technique used for the impregnation was similar to that described in Example 2, but using 120 $cm^3$ of an aqueous solution of ferric nitrate, cerous nitrate and zirconium nitrate, containing 2 g iron, 4.0 g cerium and 1.5 g zirconium, and then 120 $cm^3$ of a solution of chloroplatinic acid and hydrated rhodium trichloride, containing 160 mg platinum and 12.5 mg rhodium.

The catalyst (C) prepared in this manner contained, by weight relative to the support, 0.160% platinum, 0.0125% rhodium, 2% iron, 4.0% cerium and 1.5% zirconium.

EXAMPLE 4

Preparation of a Catalyst (D) According to the Invention 100 g of alumina spheres, as described in Example 2, were impregnated with 90 $cm^3$ of an aqueous solution of palladium nitrate, cerium nitrate, zirconium nitrate, containing 50 mg palladium, 3.5 g cerium and 1.5 g zirconium.

After 30 min of contact, the spheres were dried at 150° C., then calcined in air at 600° C. for 3 hr. They were then impregnated with 90 $cm^3$ of a solution of chloroplatinic acid and hydrated rhodium trichloride, containing 110 mg platinum and 12.5 mg rhodium.

After 30 min of contact, the spheres were dried at 150° C., then activated in air at 400° for 3 hr.

The catalyst (D) prepared in this manner contained by weight relative to the support, 0.110% platinum, 0.050% palladium, 0.0125% rhodium, 3.5% cerium and 1.5% zirconium.

EXAMPLE 5

Preparation of a Catalyst (E) According to the Invention 100 g of alumina spheres, such as those described in Example 2, were impregnated with 90 $cm^3$ of an aqueous solution of cerium nitrate and zirconium nitrate, containing 5 g cerium and 2.5 g zirconium.

After 30 min of contact, the spheres were dried at 150° C., then calcined in air at 500° C. for 3 hr. They were then impregnated with 90 $cm^3$ of a solution of chloroplatinic acid and hydrated rhodium trichloride, containing 160 mg platinum and 12.5 mg rhodium. After 30 min of contact, the spheres were dried at 150° C., then activated at 400° C. for 3 hr in a hydrogen stream circulating at 200 liters per hour.

The catalyst (E) prepared in this manner contained, by weight relative to the support, 0.160% platinum, 0.0125% rhodium, 5% cerium and 2.5% zirconium.

EXAMPLE 6

Preparation of a Catalyst (F) According to the Invention 100 g of alumina spheres of the type described in Example 3 were impregnated with an aqueous solution of cerous nitrate, zirconium nitrate and palladium nitrate, containing 2.0 g cerium, 4.0 g zirconium and 50 mg palladium.

After 30 min of contact, the spheres were dried at 150° C., then calcined in air at 550° C. for 3 hr.

They were then impregnated with 110 $cm^3$ of a solution of hexachloroplatinic acid and hydrated rhodium trichloride, containing 110 mg palladium and 12.5 mg rhodium.

After 30 min of contact, the spheres were dried at 150° C., then activated at 500° C. for 3 hr in a stream of air circulating at 200 liters per hour.

The catalyst (F) prepared in this manner contained, by weight relative to the support, 0.110% platinum, 0.05% palladium, 0.0125% rhodium, 2.0% cerium and 4.0% zirconium.

EXAMPLE 7

Activity of the Different Catalysts Measured in a Vehicle According to the American CVS-CH Cycle The present example reports the results obtained in a vehicle according to the American CVS-CH cycle using the different catalysts (A), (B), (C), (D), (E) and (F) respectively described in Examples 1 to 6, after an aging period of 600 hr in a bench engine.

An experimental muffler/catalytic converter of the cylindrical type, with radical circulation, such as that described in French Patent No. 2,270,444, having a volume of 1,700 $cm^3$, was used for these experiments.

Aging was effected by placing the muffler/catalytic converter at a distance of 0.70 m from the cylinder head outlet of an automotive engine connected to a dynamometric brake. The engine used was a RENAULT Type J7T.718 engine having a cylinder displacement of 2,165 $cm^3$, supplied by electronic fuel injection (BOSCH L-Jetronic system with oxygen probe richness control).

The operating cycle of the engine during aging consisted of the following phases:

I—6 min idling;

II—25 min at 4,000 rpm, 54 HP;
III—4 min at 2,500 rpm, 25 HP;
IV—25 min at 4,000 rpm, 54 HP.

The temperature of the gases at the inlet of the muffler/catalytic converter was 800° to 820° C. during phases II and IV of the cycle.

The aging of the catalysts was determined by transferring the mufflers/catalytic converters to a Renault Fuego USA, Model 1985, vehicle, equipped with the same type of engine as that used for the bench aging tests. Emission measurements were performed on roll bench according to the American FTP procedure described in: "Federal Register, vol. 42, No. 124 - Jun. 28, 1977, pages 32906 to 33004, Title 40, Protection of Environment, Ch. 1, Environmental Protection Agency, Part 86, Control of air pollution from new motor vehicles and new motor vehicle engines".

The regulation of the hydraulic brake simulating the resistance to the advancement of the vehicle on the road, was carried out according to the American federal standard, corresponding on the roll bench used to a traction force at balance of 25 kgf at 80 km/h.

The basic emissions of the vehicle without a catalytic converter were the following:
CO:13.6 g/mile
HC:2.6 g/mile
$NO_x$:3.3 g/mile The results obtained are reported in the Table I which follows:

TABLE I

Carbon Monoxide (CO), Hydrocarbon (HC) and Nitrogen Oxide ($NO_x$) Emissions Measured On A Vehicle According To The American CVS-CH Cycle, Expressed In Grams Per Mile:

| | No. of Example | Catalyst Reference | Emissions After Aging of the Catalyst on the Bench Engine for 600 hr | | |
|---|---|---|---|---|---|
| | | | CO | HC | $NO_x$ |
| PRIOR ART | 1 | A | 7.1 | 1.40 | 1.12 |
| | 2 | B | 6.05 | 1.12 | 0.97 |
| | 3 | C | 6.10 | 1.05 | 0.83 |
| INVENTION | 4 | D | 3.03 | 0.40 | 0.58 |
| | 5 | E | 3.35 | 0.35 | 0.55 |
| | 6 | F | 3.21 | 0.37 | 0.59 |

It will be seen that the stability of the activity of the catalysts according to the invention is markedly improved with respect to that of the catalysts according to the prior art.

EXAMPLE 8

Mechanical Properties of the Catalysts Described in Examples 1 to 6

The following mechanical properties were determined:
(i) The resistance to attrition, designated AIF, entailed determination of the mechanical impact strength and resistance to friction of the specimen exposed to intense agitation under the following conditions:
(a) $P_1$ gram of the specimen (about 10 g) were placed in a 65 cm³ stainless steel muffler/catalytic converter;
(b) the muffler/catalytic converter was agitated for 30 min using a vibrating apparatus provided by Prolabo under the designation of microgrinder DANGOUMAU (reference 7505);
(c) measurement of the quantity of product not reduced to powder: weight $P_2$.

The resistance to attrition is given by the following formula:

$$\% AIF = P_2/P_1 \times 100$$

(ii) The grain by grain crushing strength, designated EGG, expressed in kg, represented the average value of the crushing of 20 spheres of the catalysts conditioned at 500° C. for 1 hour. the measurements were carried out on an INSTROM Model 1026 crushing apparatus (speed of closing of the jaws was 0.5 mm/min).

The mechanical properties of attrition resistance, AIF, and the crushing strength, EGG, were determined using the catalysts (A), (B), (C), (D), (E) and (F) previously calcinated at 1,100° C. for 24 hr.

Table II reports the results of the attrition resistance and crushing strength measurements.

TABLE II

Attrition Resistance and Crushing Strength Of The Catalysts Of The Prior Art and Of The Invention:

| | No. of Example | Catalyst Reference | Catalysts Calcined at 1100° For 24 hr. | |
|---|---|---|---|---|
| | | | Attrition AIF % | Crushing Strength EGG kg |
| PRIOR ART | 1 | A | 23.1 | 2.6 |
| | 2 | B | 27.5 | 1.1 |
| | 3 | C | 60.4 | 2.7 |
| INVENTION | 4 | D | 67.4 | 3.8 |
| | 5 | E | 75.3 | 3.4 |
| | 6 | F | 78.9 | 3.5 |

The results reported in Tables I and II clearly demonstrate the superiority of the catalysts (D), (E) and (F) according to the invention, over the catalysts (A), (B) and (C) of the prior art, both relative to the stability of activity over time, as well as to their mechanical properties.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A multi-purpose catalyst composition adapted for the treatment of internal combustion engine exhaust gases, which comprises a particulate refractory oxide active support having an active catalytic phase deposited thereon, said active catalytic phase consisting essentially of a catalytically effective amount of zirconium, cerium and platinum, said particulate refractory support having a specific surface area of from 70 to 350 m²/g.

2. The catalyst composition as defined by claim 1, said active catalytic phase further consisting essentially of at least one of the elements iridium, palladium and rhodium.

3. The catalyst composition as defined by claim 1, wherein the total amount of cerium and zirconium ranges from 0.1% to 20% by weight, based on the weight of the support.

4. The catalyst composition as defined by claim 3, wherein the total amount of cerium and zirconium ranges from 0.3% to 12% by weight, based on the weight of the support.

5. The catalyst composition as defined by claim 3, wherein the amount of platinum ranges from 0.01% to 0.5% by weight, based on the weight of the support.

6. The catalyst composition as defined by claim 5, wherein the amount of platinum ranges from 0.03% to 0.25% by weight, based on the weight of the support.

7. The catalyst composition as defined by claim 2, wherein the total amount of iridium and/or rhodium ranges from 0.002% to 0.1% by weight, based on the weight of the support.

8. The catalyst composition as defined by claim 7, wherein the total amount of iridium and/or rhodium ranges from 0.005% to 0.02% by weight, based on the weight of the support.

9. The catalyst composition as defined by claim 2, wherein the amount of palladium ranges from 0.01% to 0.5% by weight, based on the weight of the support.

10. The catalyst composition as defined by claim 9, wherein the amount of palladium ranges form 0.03% to 0.25% by weight, based on the weight of the support.

11. The catalyst composition as defined by claim 1, which comprises a particulate active alumina support.

12. The catalyst composition as defined by claim 11, said particulate active alumina support having a specific surface of from 25 to 250 $m^2/g$, a total pore volume of from 0.5 to 2.0 $cm^3/g$, and a macroporosity such that the volume of pores having a diameter larger than 1000 Å ranges from 0.005 to 0.6 $cm^3/g$.

13. The catalyst composition as defined by claim 11, said particulate active alumina support comprising dual porosity active alumina spheres having a total pore volume of from 0.55 to 1.7 $cm^3/g$, a micropore volume of pores having a diameter less than 0.06 $\mu$m of from 0.5 to 1.0 $cm^3/g$, a macropore volume of pores having a diameter larger than 0.06 $\mu$m of from 0.05 to 0.7 $cm^3/g$, an average diameter of the macropores of from 0.1 to 10 $\mu$m, a specific surface of from 80 to 350 $m^2/g$ and a crushing strength greater than 1 kg.

14. The catalyst composition as defined by claim 4, wherein the total amount of cerium and zirconium ranges from 0.3% to 8%.

15. The catalyst composition as defined by claim 11, wherein said active alumina is in the phase form eta, gamma, delta or theta.

16. The catalyst composition is defined by claim 1, wherein said particulate refractory oxide active support is active silica, alumina, aluminosilicate or mixed oxides thereof.

* * * * *